United States Patent
Lee et al.

(10) Patent No.: US 9,005,818 B2
(45) Date of Patent: Apr. 14, 2015

(54) NEGATIVE ELECTRODE ACTIVE MATERIAL AND LITHIUM BATTERY INCLUDING THE SAME

(75) Inventors: So-Ra Lee, Yongin-si (KR); Jae-Myung Kim, Yongin-si (KR); Jun-Sik Kim, Yongin-si (KR); Kyeu-Yoon Sheem, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 561 days.

(21) Appl. No.: 13/043,099

(22) Filed: Mar. 8, 2011

(65) Prior Publication Data

US 2011/0281164 A1 Nov. 17, 2011

(30) Foreign Application Priority Data

May 14, 2010 (KR) .................. 10-2010-0045476

(51) Int. Cl.
| | |
|---|---|
| H01M 4/13 | (2010.01) |
| H01M 4/134 | (2010.01) |
| H01M 4/1395 | (2010.01) |
| H01M 4/36 | (2006.01) |
| H01M 10/052 | (2010.01) |
| H01M 10/058 | (2010.01) |
| H01M 4/133 | (2010.01) |

(52) U.S. Cl.
CPC ............ *H01M 4/134* (2013.01); *H01M 4/1395* (2013.01); *H01M 4/364* (2013.01); *H01M 4/366* (2013.01); *H01M 10/052* (2013.01); *H01M 10/058* (2013.01); *H01M 4/133* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2009/0075161 A1* | 3/2009 | Ando et al. | ............ 429/94 |
| 2009/0136846 A1 | 5/2009 | Lee et al. | |
| 2010/0119944 A1 | 5/2010 | Kim et al. | |

FOREIGN PATENT DOCUMENTS

| | | |
|---|---|---|
| JP | 2002-042808 A | 2/2002 |
| JP | 2005-18998 A | 1/2005 |
| KR | 10-2004-0073119 A | 8/2004 |
| KR | 10-2005-0016126 A | 2/2005 |
| KR | 10-2006-0039404 A | 5/2006 |
| KR | 10-2007-0059829 A | 6/2007 |
| KR | 10-2009-0011888 A | 2/2009 |

OTHER PUBLICATIONS

Hyesun Kim and Jaephil Cho, Superior Lithium Electroactive Mesoporous Si@Carbon Core#Shell Nanowires for Lithium Battery Anode Material, Nano Letter, Oct. 25, 2008, pp. 3688-3691, vol. 8 (11), American Chemical Society, Washington, DC 20036.

\* cited by examiner

*Primary Examiner* — Patrick Ryan
*Assistant Examiner* — Carmen Lyles-Irving
(74) *Attorney, Agent, or Firm* — Knobbe Martens Olson & Bear LLP

(57) ABSTRACT

A negative electrode active material including mesoporous silica having mesopores filled with a metal and a lithium battery including the same.

12 Claims, 7 Drawing Sheets

NEGATIVE ELECTRODE ACTIVE MATERIAL AND LITHIUM BATTERY INCLUDING THE SAME

CROSS-REFERENCE TO RELATED APPLICATIONS

This application claims the benefit of Korean Patent Application No. 10-2010-0045476, filed on May 14, 2010, in the Korean Intellectual Property Office, the disclosure of which is incorporated herein in its entirety by reference.

BACKGROUND

1. Field

One or more embodiments relate to a negative electrode active material and a lithium battery including the same.

2. Description of the Related Technology

Demand for secondary batteries has been rapidly increasing. Secondary batteries are used as a power source of portable electronic devices for information communication such as personal digital assistants (PDAs), mobile phones, or notebooks, as well as for electric bicycles, or electric vehicles, and are repeatedly used by being charged and discharged.

Lithium batteries are getting much attention due to their high voltage and high energy density.

Lithium batteries include a negative electrode and a positive electrode, each of which includes an active material enabling intercalation and deintercalation of lithium ions, and an organic electrolyte solution or a polymer electrolyte solution, which fills a space between the negative electrode and the positive electrode. A lithium battery having the structure described above generates electric energy by oxidation and reduction that occurs when lithium ions are intercalated or deintercalated in the positive electrode and the negative electrode.

The negative electrode active material may be a metal negative electrode active material, and currently available metal negative electrode active materials have a high theoretical capacity but may not be easy to use in lithium batteries because they swell during charging and discharging and precipitation of lithium easily occurs. Thus, there is a need to improve properties of metal negative electrode active materials. The present embodiments overcome the above problems and provide additional aspects as well.

SUMMARY

One or more embodiments include a negative electrode active material with a suppressed volumetric expansion and a lithium battery with improved lifetime and capacity characteristics, which includes the negative electrode active material.

Additional aspects will be set forth in part in the description which follows and, in part, will be apparent from the description, or may be learned by practice of the presented embodiments.

According to one or more embodiments, a negative electrode active material includes: mesoporous silica having mesopores; and at least one kind of metal selected from the group consisting of a transition metal, a Group 13 element, a Group 14 element, and a Group 15 element, which are materials that can be alloyed with lithium, wherein the metal fills the mesopores.

According to one or more embodiments, lithium battery including: a positive electrode; a negative electrode comprising the negative electrode active material; and a separator interposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
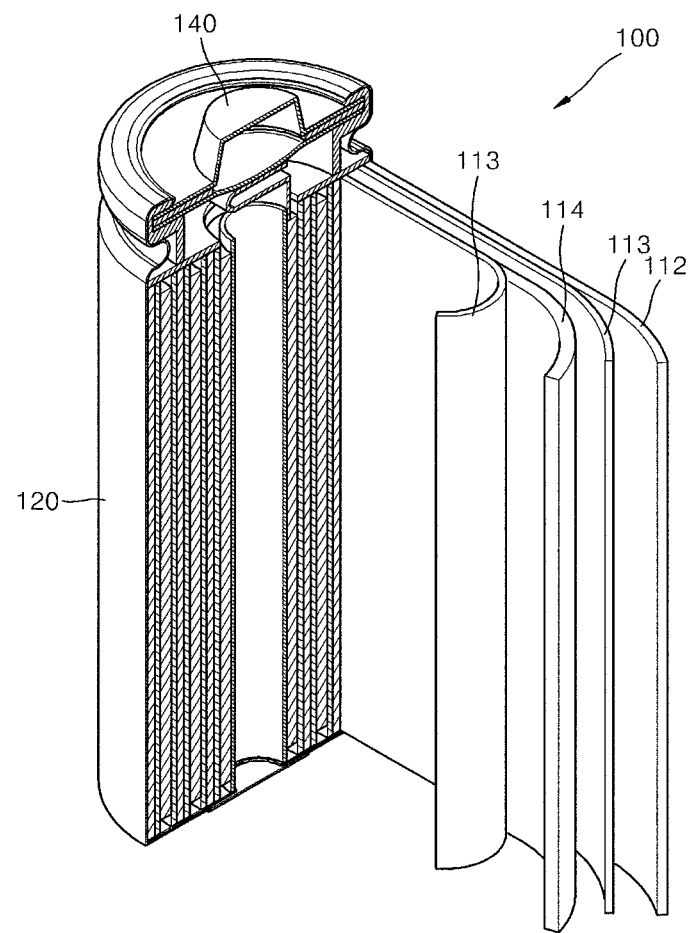
FIG. 1 is an exploded perspective view of a secondary lithium battery according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

A negative electrode active material according to an embodiment includes mesoporous silica having mesopores and at least one metal selected from the group consisting of a transition metal, a Group 13 element, a Group 14 element, and a Group 15 element, which are materials that can be alloyed with lithium, wherein the metal fills the mesopores.

A pore diameter of the mesoporous silica may be from about 2 to about 50 nm, for example, from about 2 to about 30 nm. The term "pore diameter" refers to an average diameter of pores.

The negative electrode active material retains structural stability since swelling is hindered by external walls of mesopores of the mesoporous silica, and when the negative electrode active material is used to manufacture an electrode, electrode shattering may be prevented. Accordingly, a lithium battery including such an electrode has a long lifetime and high capacity.

The metal which fills the mesopores of the mesoporous silica may include, for example, at least one metal selected from the group consisting of silicon (Si), tin (Sn), nickel (Ni), lithium (Li), germanium (Ge), lead (Pb), silver (Ag), zinc (Zn), gallium (Ga), indium (In), antimony (Sb), bismuth (Bi), and aluminum (Al). For example, the metal may be Si, but is not limited thereto.

The amount of the metal may be from about 0.5 to about 100 parts by weight, for example, about 20 to about 50 parts by weight, based on 100 parts by weight of the mesoporous silica.

If the amount of the metal is within the ranges described above, an initial charge capacity is high, and separation of the silica structure from an electrode plate by formation of cracks in the silica structure or destruction of the silica structure by swelling that may occur when the mesoporous silica reacts with the metal may be prevented.

The pore shape of the mesoporous silica may vary and may be, for example, hexagonal prism-shaped, cubic-shaped, cylinder-shaped, or lamella-shaped, or may be amorphous. However, the mesoporous silica is not so limited and may also have other pore shapes.

A specific surface area of the negative electrode active material may be from about 150 to about 1200 $m^2/g$, for example, about 600 to about 900 $m^2/g$.

The total pore volume of the negative electrode active material may be from about 0.15 to about 1, for example, about 0.2 to about 0.5 ml/g.

If the specific surface area and the total pore volume of the negative electrode active material are within the ranges described above, uniform pores may be regularly aligned and thus act as buffer against volume change. Thus, a negative electrode including the negative electrode active material has excellent capacity retention rates.

The mesoporous silica is a certain type of nanomaterial having a structured arrangement of uniform nano channels, and may be for example, MCM-48 having a cubic structure (Mobil Composition of Matter No 48 (ExxonMobil Chemical Company, Houston, Tex.)), MCM-41, KIT-1 having pores irregularly, three-dimensionally connected (Korea Advanced Institute of Science and Technology No 1), MSU-1 (Michigan State University No 1), SBA-1 having another cubic structure (Santa Barbara Amorphous No 1), SBA-16 (Santa Barbara Amorphous No 16), SBA-15 having one-dimensional mesopores connected to each other by micro pores (Santa Barbara Amorphous No 15), and SBA-3 (Santa Barbara Amorphous No 3).

For example, SBA-15 is a mesoporous material having the largest pore size among the mesoporous materials described above, and has a structured, two-dimensional hexagonal prism arrangement having mesopores having a uniform pore size. SBA-15 has thick walls, a controllable pore size, and high thermal stability.

The mesoporous silica, for example, SBA-1 may be prepared using a method suggested by Kim and Ryoo (Chem. Mater., 1999, 11, 487), and SBA-16 may be prepared using a method suggested by Kim and Stucky (Chem. Commun., 2000, 1159).

A negative electrode active material according to another embodiment may include the negative electrode active material including the mesoporous silica and the metal which fills mesopores of the mesoporous silica, which will be referred to as a first negative electrode active material hereinafter, and a second negative electrode active material selected from a carbonaceous material and an oxide that can be alloyed with lithium.

The carbonaceous material may be natural graphite or synthetic graphite.

The oxide that can be alloyed with lithium may include at least one oxide selected from the group consisting of $SiO_x$, $SnO_x$, $GeO_x$, $PbO_x$, $ZnO_x$, and $TiO_x$.

The amount of the second negative electrode active material may be from about 0.01 to 500 parts by weight based on 100 parts by weight of the first negative electrode active material.

A method of synthesizing MCM-48 or SBA-15 as the mesoporous silica will be briefly described, but is not limited thereto.

First, a surfactant having a hydrophilic head part and a hydrophobic tail part and an acid for controlling a pH are stirred. As a result, the surfactant forms micelles by self-agglomeration.

Then, when the aqueous solution is stirred for an appropriate time period at room temperature, the micelles agglomerate together to form a stick shape and then further agglomerate to form a supramolecule.

The surfactant may be poly(ethylene oxide)-poly(propylene oxide)-poly(ethylene oxide)($EO_m$-$PO_n$-$EO_m$), for example, $EO_{20}$-$PO_{70}$-$EO_{20}$.

Then, an inorganic material such as alkyl silicate is added to the supramolecule-containing aqueous solution and the mixture is slowly stirred and undergoes a hydrothermal treatment in an autoclave. The hydrophilic head part of the surfactant at the surface of the solution interacts with the inorganic material to form a complex template.

The alkyl silicate may be, for example, tetra-ethyl-orthosilicate (TEOS).

Then, the complex template is filtered from the solution, and washed and sintered to remove the surfactant, thereby obtaining the mesoporous silica.

Hereinafter, a method of preparing the negative electrode active material described above, according to an embodiment, will be described in detail.

The method comprises filling mesopores of mesoporous silica with at least one kind of metal selected from the group consisting of a transition metal, a Group 13 element, a Group 14 element, and a Group 15 element, which are materials that can be alloyed with lithium; and heat treating the mesoporous silica.

The metal may include at least one kind of metal selected from the group consisting of Si, Sn, Ni, Li, Ge, Pb, Ag, Mg, Zn, Ga, In, Sb, Bi, and Al.

The filling of mesopores of the mesoporous silica with the metal may be, for example, a vapor phase method or a liquid phase method, but is not limited thereto.

Metallic nano particles may be injected into the mesoporous silica by using various methods. For example, a mixed solution containing a metallic salt, deionized water, and a solvent is prepared, and then, the mesoporous silica as a template is added to the mixed solution. Then, the mixture is treated with ultrasonic waves at room temperature. Alternatively, amino propyl tri ethoxy silane (APTES) having an amine group is functionalized with respect to the template by refluxing and then, $KAuCl_4$ is mixed therewith, thereby allowing metallic nano particles to be injected into the template. In this regard, the mixture is mixed with a $NaBH_4$ solution as a reducing agent to remove metallic nano particles outside the template by reducing metallic nano particles.

The metallic salt may be a precursor of at least one metal selected from the group consisting of Si, Sn, Ni, Li, Ge, Pb, Ag, Mg, Zn, Ga, In, Sb, Bi, and Al, and may be a metal chloride, a metal nitrate, or the like. If the metal is silicon, the metallic salt may be, for example, silicon chloride.

In addition, a chemical vapor deposition method including a vapor-liquid-solid (VLS) process may also be used for the filling of the mesopores of the mesoporous silica. In this regard, the mesoporous silica in a powder form is placed in a boat or a crucible and then loaded into a reactor. Then, the mesoporous silica is heated while injecting gas and a wire source.

The gas used in the process described above may be for example, Ar, $N_2$, He, and $H_2$, but is not limited thereto.

In the process, the pressure may be 760 ton or lower, and the temperature may be from about 370 to about 600° C. In addition, the heating time may vary according to the length of a nanostructure.

A source of the nanostructure injected during the process may be $SiH_4$, $SiCl_4$ or $SiH_2Cl_2$, but is not limited thereto.

When metal directly fills pores of a mesoporous silica as a template, additional processes for synthesizing powder having a certain-shaped structure, for example, a stick-shaped structure may not be used. Thus, manufacturing time and costs may be reduced.

In addition, a uniform pore size may be obtained and thus, a capacity retention rate may be improved.

In the method of preparing the negative electrode active material, the heat treatment temperature may be from about 400 to about 800° C.

The heating of the mesoporous silica is not limited to any particular heating method and may be any known heating method.

If the heat treatment temperature is within the range described above, the mesoporous silica may be appropriately formed, and a uniformity of mesopores of the formed mesoporous silica may be retained.

A lithium battery according to an embodiment includes a positive electrode, a negative electrode, and a separator, wherein the negative electrode includes mesoporous silica having mesopores and at least one kind of metal selected from the group consisting of a transition metal, a Group 13 element, a Group 14 element, and a Group 15 element, which are materials that can be alloyed with lithium, wherein the metal fills the mesopores.

The positive electrode may include a current collector and a positive electrode active material layer.

The positive electrode active material layer may include a first compound (a lithiated intercalation compound) which allows reversible intercalation and deintercalation of lithium ions. Examples of the first compound may include compounds represented by the following formulae:

$Li_aA_{1-b}X_bD_2$ (wherein $0.95 \leq a \leq 1.1$, and $0 \leq b \leq 0.5$); $Li_aE_{1-b}X_bO_{2-c}D_c$ (wherein $0.95 \leq a \leq 1.1$, $0 \leq b \leq 0.5$, and $0 \leq c \leq 0.05$); $LiE_{2-b}X_ba_{4-c}D_c$ (wherein $0 \leq b \leq 0.5$, and $0 \leq c \leq 0.05$); $Li_aNi_{1-b-c}Co_bBcD_\alpha$ (wherein $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_\alpha$ (wherein $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (wherein $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (wherein $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_\alpha$ (wherein $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (wherein $0.95 \leq a \leq 1.1$, $0 \leq b \leq 0.5$, $0 \leq c \leq 0.05$, and $0 < \alpha < 2$); $Li_aNi_bE_cG_dO_2$ (wherein $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.1$, $0 \leq b \leq 0.9$, $0 \leq c \leq 0.5$, $0 \leq d \leq 0.5$, $0 \leq e \leq 0.1$); $Li_aNiG_bO_2$ (wherein $0.90 \leq a \leq 1.1$, and $0.001 \leq b \leq 0.1$); $Li_aCoG_bO_2$ (wherein $0.90 \leq a \leq 1.1$, and $0.001 \leq b \leq 0.1$); $Li_aMnG_bO_2$ (wherein $0.90 \leq a \leq 1.1$, and $0.001 \leq b \leq 0.1$); $Li_aMn_2G_bO_4$ (wherein $0.90 \leq a \leq 1.1$, and $0 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$. Another example of the first compound is lithium titanate.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof. However, each of A, X, D, M, G, Q, Z, and J is not limited thereto.

The positive electrode active material layer may further include a binder.

The binder strongly binds positive electrode active material particles together and to the current collector. Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, nylon, and polyimide, but are not limited thereto.

Al or Cu may be used for forming the current collector, but aspects of the present embodiments are not limited thereto.

The positive electrode active material layer may be formed by coating a positive electrode active material composition, which is prepared by mixing the positive electrode active material and the binder (and further the conducting agent, optionally) in a solvent, on the current collector. N-methylpyrrolidone may be used as the solvent, but the present embodiments are not limited thereto.

The negative electrode may include a negative electrode active material layer and a current collector.

The negative electrode active material layer may include a negative electrode active material which contains mesoporous silica having mesopores filled with metal. The negative electrode active material has already been described above.

A binder and a solvent used in a negative electrode active material composition may be the same as in the positive electrode.

A conducting agent that may be optionally added to the negative electrode active material layer composition may include at least one material selected from the group consisting of carbon black, ketchen black, acetylene black, artificial graphite, natural graphite, copper powder, nickel powder, aluminum powder, and polyphenylene. However, the conducting agent is not limited thereto.

A plasticizer may be further added to the positive electrode active material layer composition and the negative electrode active material layer composition in order to form pores inside electrode plates.

The electrolyte solution may include a nonaqueous organic solvent and a lithium salt.

The nonaqueous organic solvent may function as a migration medium for ions involved in electrochemical reactions in batteries.

Examples of the nonaqueous organic solvent may include carbonates, esters, ethers, alcohols, and aprotic solvents. Examples of the carbonates available as the nonaqueous organic solvent may include dimethyl carbonate (DMC), diethyl carbonate (DEC), dipropyl carbonate (DPC), methylpropyl carbonate (MPC), ethylpropyl carbonate (EPC), ethyl methyl carbonate (EMC), ethylene carbonate (EC), propylene carbonate (PC), butylene carbonate (BC), and methyl ethyl carbonate (MEC). Examples of the esters available as the nonaqueous organic solvents may include methyl acetate, ethyl acetate, n-propyl acetate, dimethyl acetate, methyl propionate, ethyl propionate, γ-butyrrolactone, decanolide, valerolactone, mevalonolactone, and caprolactone. Examples of the ethers available as the nonaqueous organic solvent may include dibutyl ether, tetraglyme, diglyme, dimethoxyethane, 2-methyltetrahydrofuran, and tetrahydrofuran. An example of the ketones available as the nonaqueous organic solvent may be cyclohexanone. Examples of the alcohols available as the nonaqueous organic solvent may include ethyl alcohol, isopropyl alcohol, and the like. Examples of the non-protonic solvents may include nitrils, such as R—CN (wherein R is a straight, branched or cyclic C2-C20 hydrocarbon group, which may have a double-bonded aromatic ring or an ether bond); amides, such as dimethylformamide; dioxolanes, such as 1,3-dioxolane; and sulfolanes.

The nonaqueous organic solvent may be used alone. Alternatively, at least two of the nonaqueous organic solvents may be used in combination. In this case, a mixing ratio of the at least two nonaqueous organic solvents may appropriately vary according to the performance of the battery, which is obvious to one of ordinary skill in the art.

The lithium salt is dissolved in the organic solvent and functions as a source of lithium ions in the battery, enabling the basic operation of the lithium battery. In addition, the lithium salt facilitates the migration of lithium ions between the positive electrode and the negative electrode. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, and $LiB(C_2O_4)_2$(LiBOB; lithium bis(oxalato) borate). The concentration of the lithium salt may be from about 0.1 to about 2.0 M. When the concentration of the lithium salt is within this range, the electrolyte solution may have an appropriate conductivity and viscosity, and thus may exhibit excellent electrolytic performance, allowing lithium ions to effectively migrate.

The separator interposed between the positive electrode and the negative electrode may be a monolayer or a multilayer including at least two layers comprising polyethylene, polypropylene, or polyvinylidene fluoride. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

Lithium batteries may be classified into lithium ion batteries, lithium ion polymer batteries, and lithium polymer batteries, according to the types of separator and electrolyte used. In addition, lithium batteries may be classified into a cylindrical type, a rectangular type, a coin type, and a pouch type, according to the battery shape, and may also be classified into a bulk type and a thin film type, according to the battery size. For example, the lithium battery according to the present embodiment may be a coin type lithium battery.

Lithium batteries may be used either as primary lithium batteries or secondary lithium batteries.

FIG. 1 is a schematic view of a structure of a secondary lithium battery 100 according to an embodiment.

Referring to FIG. 1, the lithium battery 100 according to the present embodiment includes a positive electrode 114, a negative electrode 112 and a separator 113 disposed between the positive electrode 114 and the negative electrode 112, and an electrolyte (not shown) impregnated in the positive electrode 114, the negative electrode 112 and the separator 113, a battery case 120, and a sealing member 140 for sealing the case 120, wherein the negative electrode 112 includes a negative electrode active material according to an embodiment.

The lithium battery 100 is manufactured by sequentially stacking the positive electrode 114, the negative electrode 112, and the separator 113 on one another to form a stack, winding the stack in a jelly roll form, and accommodating the wound stack in the battery case 120.

Hereinafter, one or more embodiments will be described in further detail with reference to the following examples. These examples are not intended to limit the purpose and scope of the one or more embodiments.

EXAMPLE 1

Preparation of SBA-15 Filled with Si

Surfactant ($EO_{20}PO_{70}EO_{20}$, Pluronic 123, Aldrich company) was dissolved in 150 ml of HCl (37%, Riedel-de Haen) (1.6M) and stirred for 1 hour at room temperature.

Then, 8.8 g of TEOS($C_8H_{20}O4Si$, Merck company) was added to the resulting solution and stirred at a temperature of 35 to 40° C. for 20 hours. The obtained product was left at a temperature of 95 to 100° C. for 24 hours and then washed, thereby obtaining white powder. The white powder was calcinated at a temperature of 650° C. for 8 hours.

A BET surface area of calcinated pure SBA-15 was 656.0 $m^2/g$, and an average diameter of mesopores thereof was 8.64 nm.

Figure 2A:
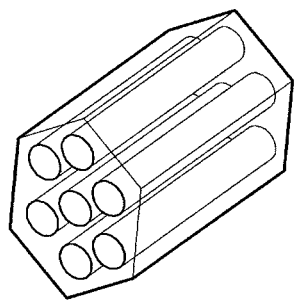
FIG. 2A is a schematic view of a pristine SBA-15 manufactured according to Example 1.
Figure 2B:
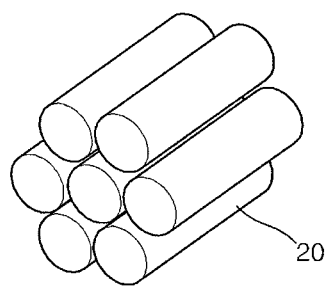
FIG. 2B is a schematic view of the pristine SBA-15 of FIG. 2A having mesopores filled with silicon (Si)
Figure 2B:
Figure 2B:
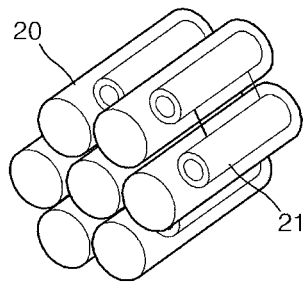

FIG. 2A is a schematic view of a pristine SBA-15 20 manufactured according to Example 1, and FIG. 2B is a schematic view of the pristine SBA-15 20 of FIG. 2A having mesopores filled with silicon (Si) 21.

4 g of pristine SBA-15 was dipped in a solution prepared by dissolving 10 g of $SiCl_4$ in 100 ml of ethanol and then sonication was performed thereon for 1 hour, thereby allowing the $SiCl_4$ ethanol solution to uniformly permeate into pores of the pristine SBA-15. The result was placed in an evaporator and dried therein, then washed and dried three or more times. Then, the product was heat treated at a temperature of 650° C. for 5 hours, thereby producing Si-filled SBA-15.

EXAMPLE 2

Manufacture of Lithium Battery

The 50 parts by weight of Si-filled SBA-15 prepared according to Example 1 was added to 30 parts by weight of Super P carbon black and 20 parts by weight of polyimide, thereby preparing a negative electrode slurry composition.

The negative electrode slurry composition was coated on an Al foil to form a thin electrode plate having a thickness of 60 μm, then the thin electrode plate was dried at a temperature of 135° C. for 3 hours or more, and then, pressed to a thickness of 50 μm. The resulting electrode plate was punched in a circular form having a size of 13Φ and then the weight thereof was measured. Then, the electrode plate was processed to enable welding and then the weight thereof was measured. The electrode plate was welded to a lower portion of a 2032 coin cell and was then placed in an evacuated vacuum oven at a temperature of 250° C. for 5 hours, thereby completing the manufacture of a negative electrode.

Separately, a positive electrode was manufactured using lithium, and a polyethylene separator was interposed between the positive electrode and the negative electrode, thereby forming a battery assembly. The battery assembly was placed in a battery case and then an electrolyte solution (1.15M LiPF$_6$ and EC/EMC/DEC(3:3:4)) was injected thereto, thereby completing the manufacture of a lithium battery.

COMPARATIVE EXAMPLE 1

Preparation of Pristine SBA-15

Surfactant (EO$_{20}$PO$_{70}$EO$_{20}$, Pluronic 123, Aldrich company) was dissolved in 150 ml HCl (37%, Riedel-de Haen) (1.6M) and then stirred at room temperature for one hour.

Then, 8.8 g of TEOS(C$_8$H$_{20}$O$_4$Si, Merck company) was added to the solution and stirred at a temperature of 35 to 40° C. for 20 hours. The resulting mixture was left at a temperature of 95 to 100° C. for 24 hours and washed, thereby obtaining white powder. The obtained powder was calcinated at a temperature of 650° C. for 8 hours.

A BET surface area of the calcinated pristine SBA-15 was 656.0 m$^2$/g, and an average diameter of mesopores thereof was 8.64 nm.

COMPARATIVE EXAMPLE 2

Preparation of Lithium Battery

A lithium battery was manufactured in the same manner as in Example 2, except that 61.7 parts by weight of pristine SBA-15 prepared according to Comparative Example 1 was used instead of the 50 parts by weight of the Si-filled SBA-15 that was prepared according to Example 1.

Figure 3A:
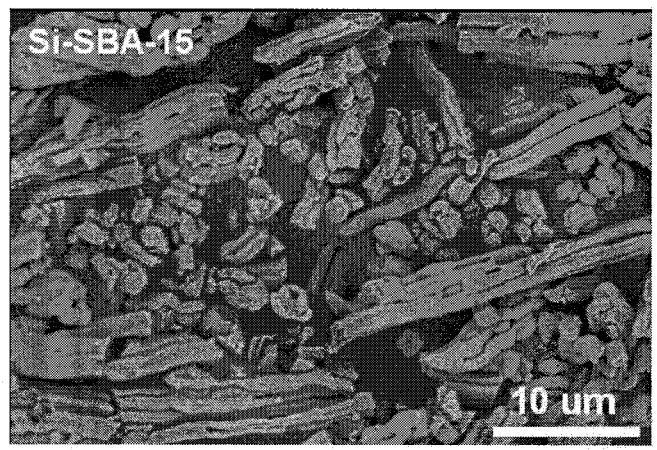
FIG. 3A is a scanning electron microscopic (SEM) image (~10,000× magnification) of the negative electrode active material of Example 1.

The negative electrode active materials prepared according to Example 1 and Comparative Example 1 were identified by using a scanning electron microscope (SEM). FIG. 3A is a scanning electron microscopic (SEM) image (10,000× magnification) of the negative electrode active material of Example 1, FIG. 3B is a SEM image (5,000× magnification) of the negative electrode active material of Example 1, FIG. 4A is a SEM image (10,000× magnification) of the negative electrode active material of Comparative Example 1, and FIG. 4B is a SEM image (5,000× magnification) of the negative electrode active material of Comparative Example 1.

Figure 3B:
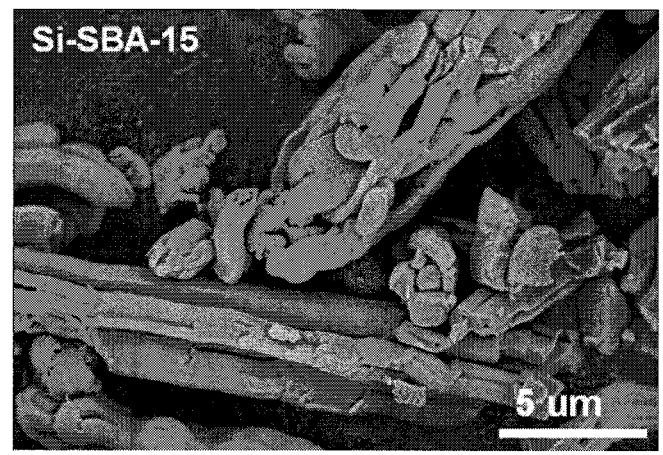
FIG. 3B is a SEM image (~5,000× magnification) of the negative electrode active material of Example 1.
Figure 4A:
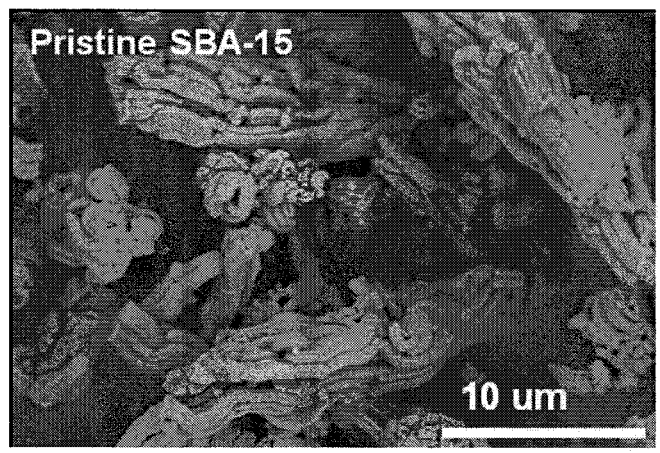
FIG. 4A is a SEM image (~10,000× magnification) of a negative electrode active material of Comparative Example 1.
Figure 4B:
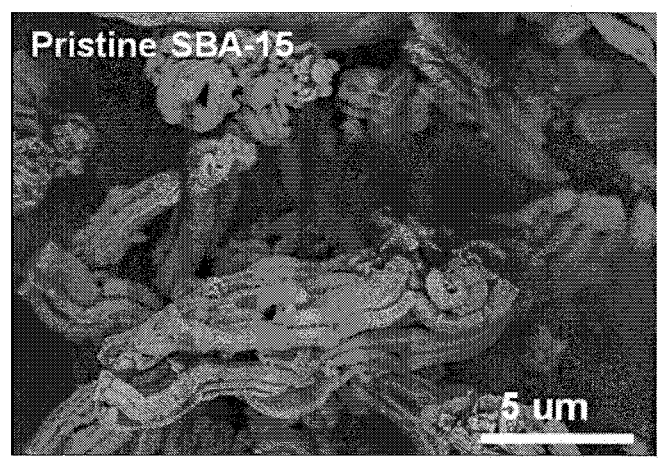
FIG. 4B is a SEM image (~5,000× magnification) of the negative electrode active material of Comparative Example 1.

Referring to FIGS. 3A and 3B, it can be identified that Si fills SBA-15 and is not exposed to the surface of SBA-15.

Figure 5:
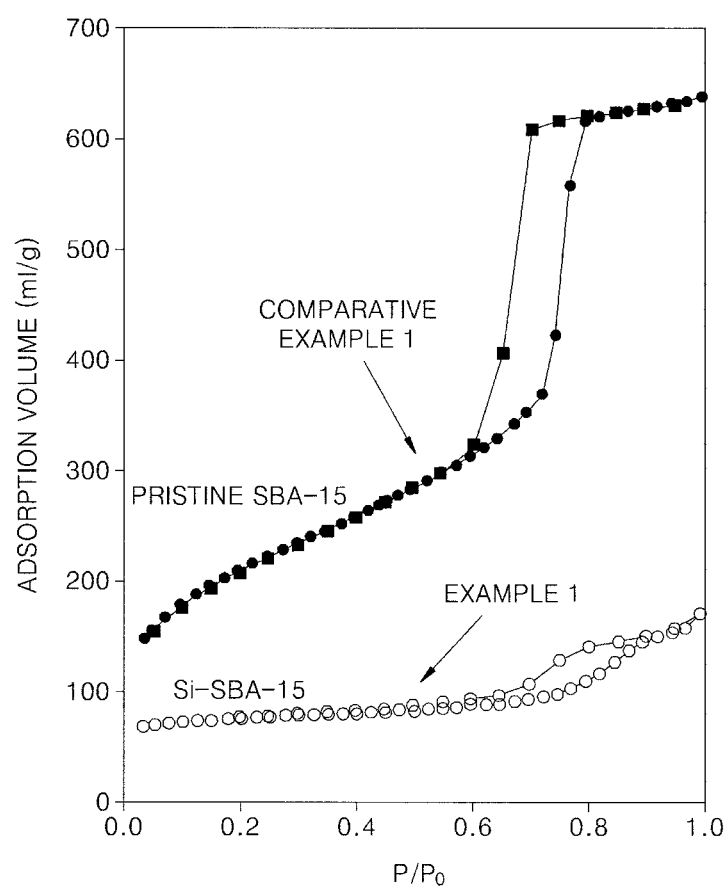
FIG. 5 is a graph of $N_2$ adsorption isotherms of negative electrode active materials prepared according to Example 1 and Comparative Example 1.

Nitrogen adsorption characteristics of the negative electrode active materials prepared according to Example 1 and Comparative Example 1 were evaluated, and the results are shown in FIG. 5.

Referring to FIG. 5, the pore volume and the specific surface of the negative electrode active material prepared according to Example 1 were decreased more than those of the negative electrode active material prepared according to Comparative Example 1, which means that Si appropriately fills pores.

EVALUATION EXAMPLE 1

Evaluation

A BET surface area, a total pore volume, and a diameter obtained by Barrett-Joyner Halenda (BJH) analysis, of each of mesopores of SBA-15 prepared according to Example 1 and Comparative Example 1 are shown in Table 1 below.

TABLE 1

| | | BET surface area (m$^2$/g) | Total pore volume (ml/g) | Average diameter of mesopores by BJH analysis (nm) |
|---|---|---|---|---|
| Comparative Example 1 | SBA-15 (650° C. before heat treatment) | 724.0 | 0.969 | 8.65 |
| | (SBA-15) (650° C. after heat treatment) | 656.0 | 0.869 | 8.64 |
| Example 1 | Si-SBA-15 | 282.2 | 0.237 | 12.3 |

Referring to Table 1, compared to Comparative Example 1, when mesopores of SBA-15 were filled with Si according to Example 1, the BET surface area of the SBA-15 was reduced and the total pore volume of the SBA-15 was reduced.

EVALUATION EXAMPLE 2

Battery Performance Evolution

Cycle lifetime of lithium batteries manufactured according to Example 2 and Comparative Example 2 was measured, and the results are shown in FIGS. 6A and 7A.

The cycle lifetime of the lithium batteries was evaluated under the following conditions.

Figure 6:
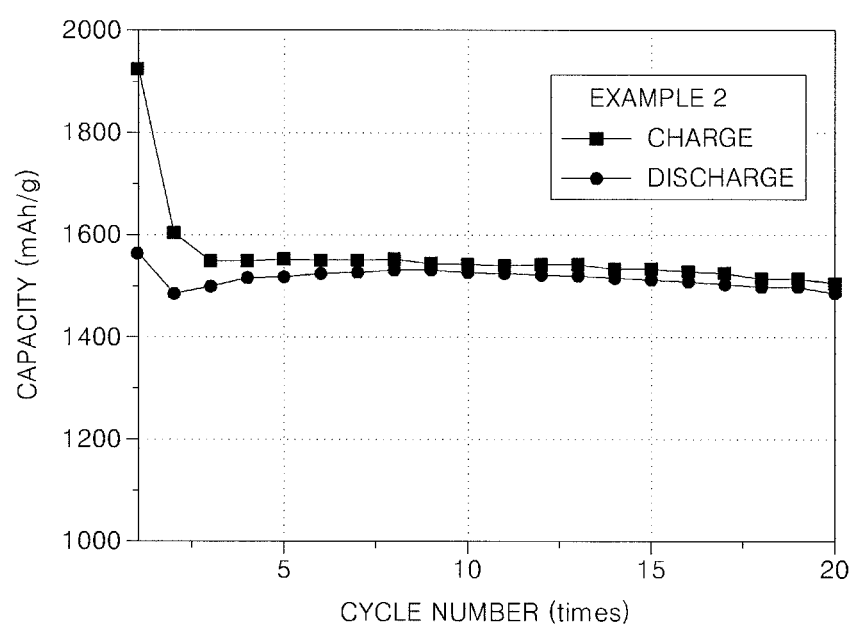
FIG. 6 is a graph of a cycle lifetime of a lithium battery manufactured according to Example 2.
Figure 7:
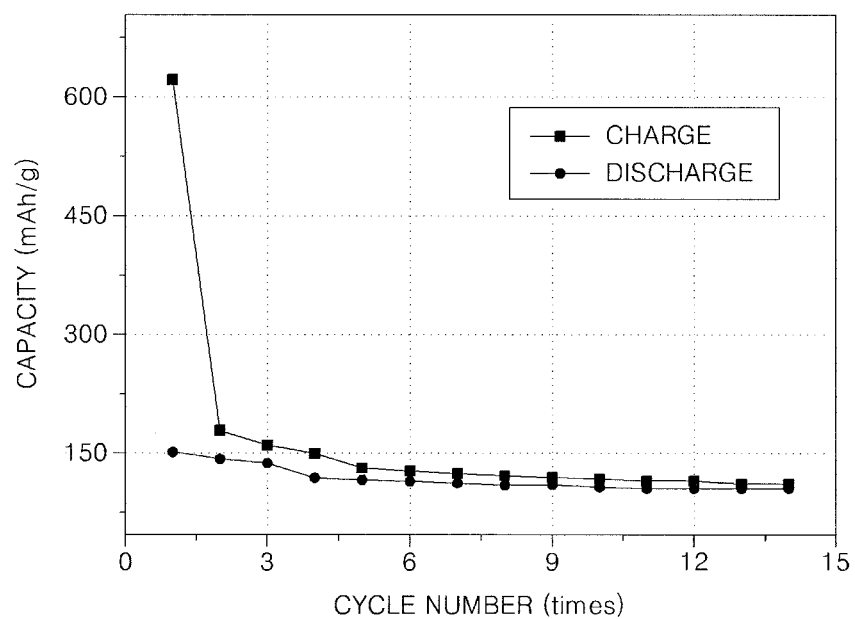
FIG. 7 is a graph of a cycle lifetime of a lithium battery manufactured according to Comparative Example 2.

The lithium batteries of Example 1 and Comparative Examples 1 and 2 were charged at 0.1 C and 0.01 V in a constant current/constant voltage (CC/CV) mode and then discharged up to 0.01 V. The lithium batteries were charged at 0.1 C and 0.01 V in a constant current/constant voltage (CC/CV) mode and then discharged up to 1.5 V. The lithium batteries were charged at 0.2 C and 0.01 V in a constant current/constant voltage (CC/CV) mode and then discharged up to 1.5 V to formation process. After completion of the formation process, capacities of each of the lithium batteries were measured while repeating further charging and discharging cycles at 0.5 C/0.5 C, in order to evaluate a cycle lifetime of the lithium batteries. The cycle lifetime was measured as a relative capacity in % with respect to 100% of the capacity after the initial cycle. FIGS. 6 and 7 are 0.5 C/0.5 C cycle lifetime graphs of the lithium batteries manufactured according to Example 2 and Comparative Example 2, respectively.

Referring to FIGS. 6 and 7, it can be seen that the capacity and lifetime of the lithium battery manufactured according to Example 2 are higher than those of Comparative Example 2.

In regard to the lithium batteries manufactured according to Example 2 and Comparative Example 2, a charge profile of each battery was evaluated. As a result, it can be seen that the lithium battery manufactured according to Example 2 shows stable charge/discharge characteristics due to Si, compared to the lithium battery manufactured according to Comparative Example 2.

As described above, according to the one or more of the above embodiments, a negative electrode active material is resistant to swelling. A lithium battery including the negative electrode active material has high capacity and a long lifetime.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A negative electrode active material comprising:
   mesoporous silica having mesopores; and
   at least one metal selected from the group consisting of a transition metal, a Group 13 element, a Group 14 element, and a Group 15 element,
   wherein the metal is capable of being alloyed with lithium, and;
   wherein the metal fills the mesopores and directly contacts the mesoporous silica;
   wherein the metal comprises at least one element selected from the group consisting of Si, Sn, Ni, Li, Ge, Pb, Ag, Zn, Ga, In, Sb, Bi, and Al,
   wherein the amount of the metal is from about 0.5 to about 100 parts by weight based on 100 parts by weight of the mesoporous silica, and
   wherein the total pore volume of the negative electrode active material is from about 0.2 to about 0.5 ml/g.

2. The negative electrode active material of claim 1, wherein a specific surface area of the negative electrode active material is from about 150 to about 1000 m$^2$/g.

3. The negative electrode active material of claim 1, wherein an average diameter of mesopores of the mesoporous silica is from about 2 to about 50 nm.

4. The negative electrode active material of claim 1, wherein an average diameter of mesopores of the mesoporous silica is from about 2 to about 30 nm.

5. The negative electrode active material of claim 1, wherein the metal is silicon.

6. The negative electrode active material of claim 1, further comprising a second negative electrode active material selected from a carbonaceous material and an oxide that can be alloyed with lithium.

7. A lithium battery comprising:
   a positive electrode;
   a negative electrode comprising the negative electrode active material of claim 1; and
   a separator interposed between the positive electrode and the negative electrode.

8. A lithium battery comprising:
   a positive electrode;
   a negative electrode comprising the negative electrode active material of claim 2; and
   a separator interposed between the positive electrode and the negative electrode.

9. A lithium battery comprising:
   a positive electrode;
   a negative electrode comprising the negative electrode active material of claim 3; and
   a separator interposed between the positive electrode and the negative electrode.

10. A lithium battery comprising:
    a positive electrode;
    a negative electrode comprising the negative electrode active material of claim 4; and
    a separator interposed between the positive electrode and the negative electrode.

11. A lithium battery comprising:
    a positive electrode;
    a negative electrode comprising the negative electrode active material of claim 5; and
    a separator interposed between the positive electrode and the negative electrode.

12. A lithium battery comprising:
    a positive electrode;
    a negative electrode comprising the negative electrode active material of claim 6; and
    a separator interposed between the positive electrode and the negative electrode.

* * * * *